US011089098B2

(12) United States Patent
Kandula et al.

(10) Patent No.: US 11,089,098 B2
(45) Date of Patent: Aug. 10, 2021

(54) MIGRATION AS A SERVICE-BASED SERVER AND AGENT APPLICATIONS MIGRATION

(71) Applicant: VMWARE, INC., Palo Alto, CA (US)

(72) Inventors: Srinivas Kandula, Bangalore (IN); Gaurav Gupta, Bangalore (IN); Arunvijai Sridharan, Bangalore (IN); Vibhu Rastogi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 163 days.

(21) Appl. No.: 16/137,554

(22) Filed: Sep. 21, 2018

(65) Prior Publication Data

US 2020/0036785 A1 Jan. 30, 2020

(30) Foreign Application Priority Data

Jul. 24, 2018 (IN) .............................. 201841027807

(51) Int. Cl.
*G06F 9/48* (2006.01)
*H04L 29/08* (2006.01)
*H04L 12/24* (2006.01)

(52) U.S. Cl.
CPC ........ *H04L 67/1095* (2013.01); *H04L 41/082* (2013.01)

(58) Field of Classification Search
CPC .......................... H04L 67/1095; H04L 41/082
See application file for complete search history.

(56) References Cited

U.S. PATENT DOCUMENTS

| | | | | |
|---|---|---|---|---|
| 6,738,801 | B1* | 5/2004 | Kawaguchi | G06F 8/65 709/208 |
| 2007/0067766 | A1* | 3/2007 | Tal | G06F 8/71 717/168 |
| 2007/0150526 | A1* | 6/2007 | D'Souza | G06F 16/252 |
| 2007/0245332 | A1* | 10/2007 | Tal | G06F 8/65 717/168 |
| 2012/0102457 | A1* | 4/2012 | Tal | G06F 8/65 717/121 |
| 2013/0007216 | A1* | 1/2013 | Fries | G06F 9/4856 709/218 |
| 2013/0085989 | A1* | 4/2013 | Nayyar | G06F 16/119 707/610 |
| 2013/0246623 | A1* | 9/2013 | Seth | H04L 47/783 709/226 |

(Continued)

*Primary Examiner* — Philip J Chea
*Assistant Examiner* — Wuji Chen

(57) ABSTRACT

In one example, a request to migrate a server application running on a first server to a second server with a change in a version of the server application may be received. Migration information may be provided to a cloud-based Migration as a Service provider based on the request. An application migration component may be received from the cloud-based Migration as a Service provider upon validation of the migration information. The server application may be migrated from the first server to the second server with the change in the version of the server application using the application migration component and the cloud-based Migration as a Service provider. A first version of an agent application in a client may be upgraded with a modified version of the agent application using the application migration component.

25 Claims, 4 Drawing Sheets

(56) References Cited

U.S. PATENT DOCUMENTS

| | | | |
|---|---|---|---|
| 2015/0067665 A1* | 3/2015 | Thomas | G06F 8/65 |
| | | | 717/168 |
| 2016/0085543 A1* | 3/2016 | Islam | G06F 11/1433 |
| | | | 717/171 |
| 2017/0134519 A1* | 5/2017 | Chen | H04L 67/32 |
| 2017/0147811 A1* | 5/2017 | Angelsmark | G06F 21/53 |
| 2018/0293017 A1* | 10/2018 | Curley | G06F 3/0604 |
| 2020/0034192 A1* | 1/2020 | Kandula | G06F 9/546 |

\* cited by examiner

MIGRATION AS A SERVICE-BASED SERVER AND AGENT APPLICATIONS MIGRATION

RELATED APPLICATIONS

Benefit is claimed under 35 U.S.C. 119(a)-(d) to Foreign Application Serial No. 201841027807 filed in India entitled "MIGRATION AS A SERVICE-BASED SERVER AND AGENT APPLICATIONS MIGRATION", on Jul. 24, 2018, by VMware, Inc., which is herein incorporated in its entirety by reference for all purposes.

TECHNICAL FIELD

The present disclosure relates to server-client environments, and more particularly to methods, techniques, and systems to migrate server applications between servers and upgrading corresponding agent applications using a cloud-based Migration as a Service (MaaS).

BACKGROUND

As client-server computing environments have grown in popularity and capability, there has been a proliferation of applications (e.g., client applications) storing data on servers for analytics. In such a client-server computing environment, a server may communicate with multiple clients, with each client having an agent to collect metrics from underlying operating system (OS) and/or services on the client, consolidate the metrics to generate consolidated data, and report the consolidated data to the server for storage and analysis. Further, server applications or services provided by the server may be modified and deployed to improve customer experience, to add new features, to solve security issues, and the like.

The modifications or improvements made in the server application may reflect changes in binary files associated with the server application. Further, the modifications may have to be deployed via a different version of the server application. To incorporate the modifications, the server application may need to be upgraded to a corresponding version. In some cases, the server application running on one server may need to be migrated to a different server, for instance, to support the modifications incorporated in the upgraded version.

Figure 1A:
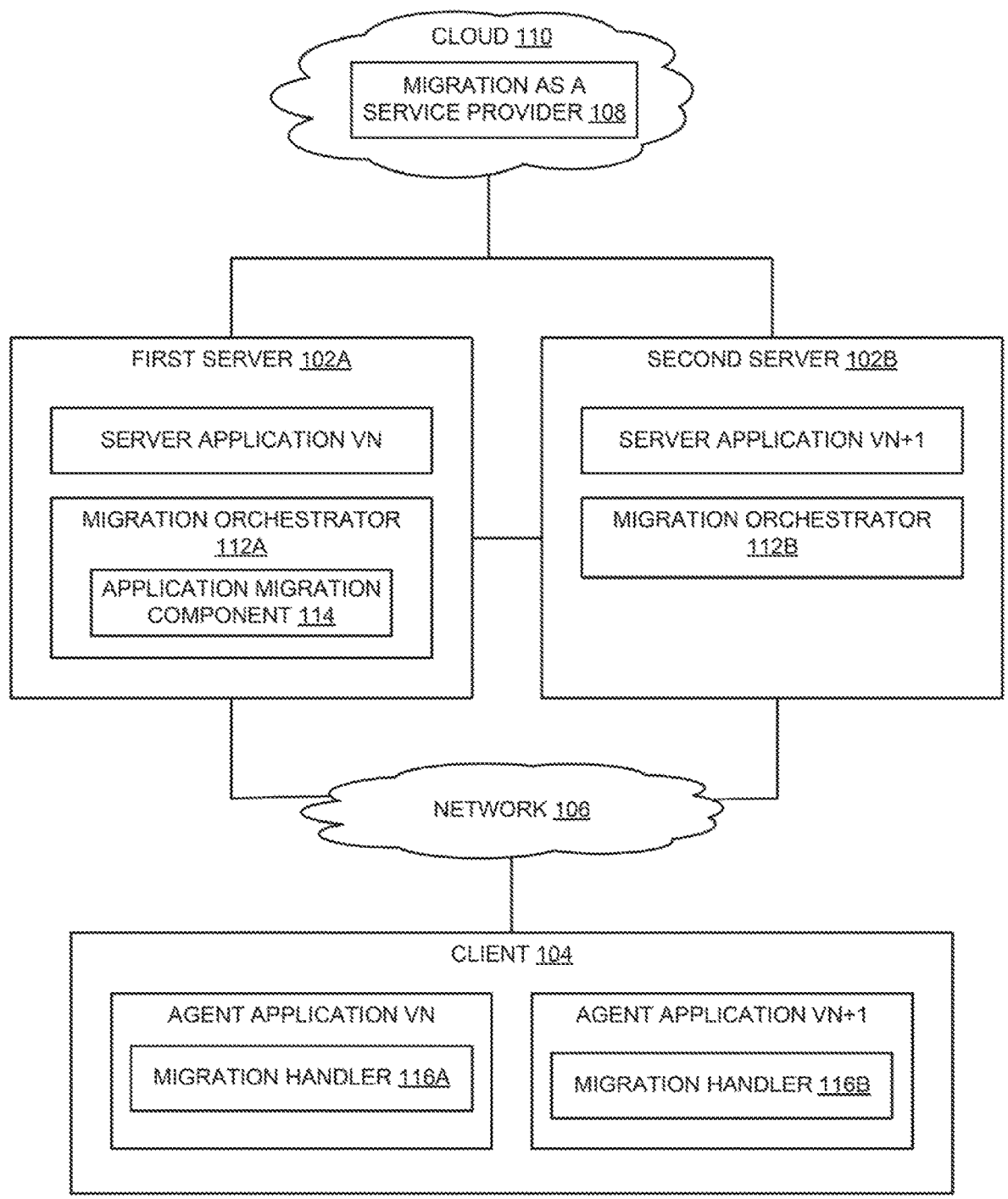
FIG. 1A is a system view of an example computing environment illustrating migration of a server application between servers using a cloud-based Migration as a Service (MaaS)

The drawings described herein are for illustration purposes only and are not intended to limit the scope of the present subject matter in any way.

DETAILED DESCRIPTION

Embodiments described herein may provide an enhanced computer-based and network-based method, technique, and system to migrate server applications between servers and upgrading corresponding agent applications in clients using a migration as a service (MaaS). In application/operating system (OS) monitoring environments or client-server computing environments, a server may communicate with multiple clients. For example, clients may include virtual machines, computing devices, Internet of Things (IoT) gateways, and the like. In a client-server system, the client may send a service request to a server. A server application in the server may process the service request and respond with the result. Each client may include the agent application to collect metrics from underlying operating system (OS) and/or services on the client, consolidate the metrics to generate consolidated data, and reports the consolidated data to the server for storage and analysis.

In such a client-server computing environment, there can be multiple software components involved for executing the agent application (e.g., in the client) and the server application (e.g., in the server). To improve customer experience, modifications may have to be made to the server/agent application via an upgraded version of the server/agent application, for instance, to include new features, solve security issues, and the like. Further, the server application associated with the server may have to be migrated to another server (e.g., an upgraded server) with the upgraded version, for instance, to incorporate the modifications made to the server application. Migration of the server application may refer to a process of transferring server data, configuration, and software binaries from one version to another version between servers. Also, the agent application running on the client may have to conform to the modifications incorporated in the upgraded server application.

Some methods for migrating the server application between the servers may include migrating the server application between the servers manually. The migration of the server application between the servers may include complex process or sequence of steps that a skilled person may have to perform manually in different phases such as production, testing, development, and performance of the server application. Particularly, when multiple software components such as a monitoring server and monitoring agents that run on different endpoints are involved, migrating the server application manually may not be feasible.

Examples described herein may migrate a server application between servers and a corresponding agent application in a client using a cloud-based MaaS and a migration orchestrator service. Examples described herein may receive a request to migrate a server application running on a first server to a second server with a change in a version of the server application, provide migration information to a cloud-based MaaS provider based on the request, receive an application migration component from the cloud-based MaaS provider upon validation of the migration information, migrate the server application from the first server to the second server with the change in the version of the server application using the application migration component and the cloud-based MaaS provider, and upgrade a first version of an agent application in a client with a modified version of the agent application using the application migration component, where the agent application is to communicate with the server application.

System Overview and Examples of Operation

FIG. 1A is a system view of an example computing environment 100 illustrating migration of a server application between servers using a cloud-based MaaS (MaaS). As shown in FIG. 1A, computing environment 100 may include a first server 102A and a client 104 that are in communication over network(s) 106. Client 104 may refer to a computing device or computer program (i.e., executing on a computing device) that requests services from first server 102A. Example client 104 may include, but not limited to, virtual machines, containers, internet of things (IoT) gateways, and computing devices.

For examples, computing environment 100 may be a client-server computing environment, in which a server may communicate with multiple clients (e.g., physical computing devices). In other examples, computing environment 100 may be operated by a cloud computing service provider and exposed as a service available to tenants (e.g., account holders), such as enterprises. Example cloud computing platform may include, but not limited to, Amazon Web Services (AWS), Google Cloud Platform, Windows Azure, OpenStack, or any other cloud computing platform. Further, computing environment 100 may be configured to dynamically provide an enterprise or users with one or more virtual data centers in which a user may provision VMs, containers, and/or deploy multi-tier applications.

The virtual machines, in some examples, may operate with their own guest operating systems on a computing device using resources of the computing device virtualized by virtualization software (e.g., a hypervisor, virtual machine monitor, and the like). A container is a data computer node that runs on top of a host operating system without the need for a hypervisor or separate operating system. First server 102A may refer to a computing device, or computer program (i.e., executing on a computing device), that provides some service to client programs or client 104. Further, client 104 and first server 102A may communicate over communication links (e.g., network 106). Communication is according to a protocol, which may be a message-based protocol.

Example network 106 can be a managed Internet protocol (IP) network administered by a service provider. For example, network 106 may be implemented using wireless protocols and technologies, such as WiFi, WiMax, and the like. In other examples, network 106 can also be a packet-switched network such as a local area network, wide area network, metropolitan area network, Internet network, or other similar type of network environment. In yet other examples, network 106 may be a fixed wireless network, a wireless local area network (LAN), a wireless wide area network (WAN), a personal area network (PAN), a virtual private network (VPN), intranet or other suitable network system and includes equipment for receiving and transmitting signals.

Client 104 may include an agent application VN running on client 104, where VN refers to a version number of the agent application. The version number may be specified to track and control modifications made to an application. Agent application VN may collect metrics (e.g., quality of service metrics (QoS)) regarding a service on client 104. Further, agent application VN may report the metrics data to first server 102A for storage and analysis by a server application VN, where VN refers to a version number of the server application. Examples described in FIG. 1A depict first server 102A in communication with client 104, however, in some examples, a group of servers or a cluster of servers can communicate with multiple clients over one or more networks to provide services to clients.

In one example, first server 102A may include a migration orchestrator 112A. Migration orchestrator 112A may facilitate the migration of server application VN from first server 102A to a second server 102B. For example, when an upgraded version (e.g., server application VN+1) of server application VN is available, migration orchestrator 112A may automate migration of the server application VN between servers (e.g., from first server 102A to second server 102B) with an upgraded version (e.g., server application VN+1) using the cloud-based MaaS. In some examples, migration orchestrator 112A may reside in server application VN or may reside as a separate component in first server 102A and communicate with server application VN. Migration orchestrator 112A may run as an on-demand service in first server 102A. Further, first server 102A and second server 102B may be physical servers (i.e., on-premise servers) and/or virtual servers.

Further, computing environment 100 may include a MaaS provider 108 in a cloud 110 to provide the MaaS on demand. Cloud 110 may deliver information technology (IT) services in which resources are retrieved from the Internet through web-based tools and applications. MaaS may be referred as a software distribution model in which a third-party provider hosts components for migration of server application VN between servers (e.g., from first server 102A to second server 102B) with the upgraded version (e.g., server application VN+1). MaaS provider 108 may make the components available to servers (e.g., first server 102A and second server 102B) over the network (e.g., Internet). MaaS provider 108 may be implemented as engines or modules including any combination of hardware and programming to implement the functionalities described herein. The functions of MaaS provider 108 may also be implemented by a respective processor.

During operation, migration orchestrator 112A may receive a request to migrate server application VN running on first server 102A to second server 102B with a change in the version (e.g., server application VN+1) of server application VN. For example, the request to migrate may be triggered by an administrator of first server 102A. Further, migration orchestrator 112A may provide migration information to MaaS provider 108 in cloud 110 based on the request. In one example, the migration information may include configuration details associated with first server 102A, configuration details associated with second server 102B, and version details of the server application (e.g., VN and VN+1).

Migration orchestrator 112A may receive an application migration component 114 from MaaS provider 108 based on the migration information. In one example, MaaS provider 108 may receive the migration information from migration orchestrator 112A. Further, MaaS provider 108 validates the received migration information. For example, validation of migration information may include determining compatibility, checking versions, and so on to provide application migration component 114. Upon successful validation of the migration information, MaaS provider 108 may provide application migration component 114 to migration orchestrator 112A. In one example, migration orchestrator 112A may receive application migration component 114 as a service, for instance, from MaaS provider 108. Upon receiving application migration component 114 from MaaS provider 108, migration orchestrator 112A may load application migration component 114 on first server 102A. In some examples, migration orchestrator 112A may load application migration component 114 into a process of server application VN.

In one example, migration orchestrator 112A may migrate server application VN from first server 102A to second server 102B with the change in the version (e.g., server application VN+1) of server application VN using application migration component 114 and MaaS provider 108.

Figure 1B:
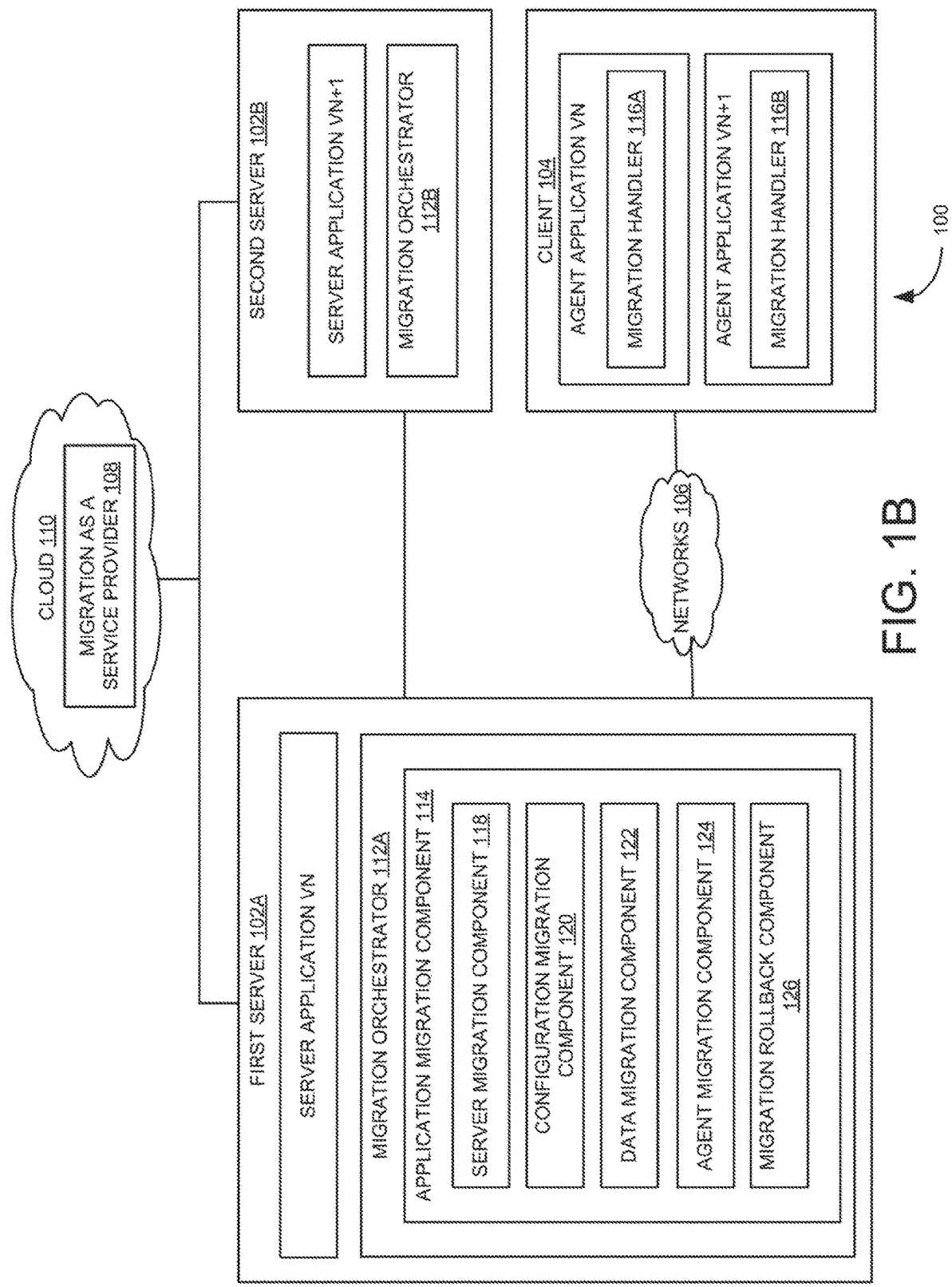
FIG. 1B is a system view of the example computing environment of FIG. 1A, depicting additional features of an application migration component.

Migrating server application VN between first server 102A and second server 102B using application migration component 114 is described in FIG. 1B.

Further, agent application VN, which is in communication with server application VN, may have to be upgraded to comply to modifications incorporated in server application VN+1. Thus, migration orchestrator 112A may upgrade agent application VN in client 104 to another version (e.g., agent application VN+1) using application migration component 114 and a migration handler 116A of agent application VN. Upgrading agent application VN to agent application VN+1 is described in FIG. 1B.

In one example, prior to migration, agent application VN of client 104 may be in communication with server application VN in first server 102A. Upon migration, agent application VN+1 of client 104 may communicate with server application VN+1 in second server 102B. Further, second server 102B may include a migration orchestrator 112B to migrate server application VN+1 to another version in future via communicating with MaaS provider 108. Also, agent application VN+1 may include a migration handler 116B to upgrade to another version in future.

FIG. 1B is a system view of example computing environment 100 of FIG. 1A, depicting additional features of application migration component 114. The structure and functionalities of servers (e.g., first server 102A and second server 102B), client 104, and MaaS provider 108 is described in FIG. 1A. In one example, application migration component 114 may include migration helper binaries such as a server migration component 118, a configuration migration component 120, and a data migration component 122 to perform migration of the server application from first server 102A to second server 102B with the change in the version (e.g., server application VN+1) of the server application VN.

During operation, server migration component 118 may download one or more binary files associated with a modified version (e.g., server application VN+1) of server application VN in first server 102A from MaaS provider 108. The binary files may include executable (e.g., ready-to-run) programs by a computing system. Upon downloading the one or more binary files, server migration component 118 may deploy the one or more binary files in second server 102B.

Configuration migration component 120 may migrate configuration data and/or custom configuration data (e.g., specific to first server 102A) associated with a first version VN of the server application to the modified version VN+1 of the server application between first server 102A and second server 102B. Configuration data may include server operation parameters such as network port number, security settings, software drivers, and the like. During migration, configuration migration component 120 may copy the configuration data from first server 102A to second server 102B.

Data migration component 122 may provide seamless migration from the first version (e.g., server application VN) to the modified version (e.g., server application VN+1) based on configuration details. In one example, MaaS provider 108 may include compatibility or version mapping details of server application VN and server application VN+1 to provide the seamless migration from the first version VN to the modified version VN+1. For example, consider a current version of the server application as VN and a target version of the server application as VN+2 or VN+3. Based on current version VN and target version VN+2 or VN+3 of the server application, MaaS provider 108 may provide data migration component 122 to migration orchestrator 112A to provide seamless migration from server application version VN to server application version VN+2 or server application version VN+3. Thus, incremental migration may not be required to be performed manually. For example, consider the server application is on version 4.8. When the server application may have to be migrated to version 7.5, there is no need to be migrated to intermediate versions and data migration component 122 may take care of intermediate steps to have seamless migration path.

In one example, application migration component 114 may include an agent migration component 124 to upgrade the first version VN of agent application in client 104 with the modified version VN+1 of the agent application. Agent application version VN may communicate with server application version VN. For example, agent migration component 124 may determine agent application version VN that communicates with server application version VN by coordinating with migration handler 116A of agent application VN. Upon determining agent application version VN, agent application version VN may be upgraded to agent application version VN+1 by pushing one or more binary files associated with the agent application VN+1 to client 104.

In one example, agent migration component 124 may work in congestion with migration handler 116A of agent application VN. For example, agent migration component 124 may find an inventory of clients (e.g., client 104) that are connected with first server 102A and initiates migration on the clients by pushing the binary files associated with the upgraded version of corresponding agent application. Migration handler 116A may provide an interface for life cycle management of the agent application such as installing and/or configuration of new agent application (e.g., agent application VN+1) and stopping previous agent application (e.g., agent application VN).

In one example, application migration component 114 may include a migration rollback component 126. During failover of the migration process, migration rollback component 126 may rollback migration of the server application VN. Further, migration rollback component 126 may rollback upgradation of the first version of the agent application (e.g., agent application VN) in client 104. Thus, in case of failover, migration rollback component 126 may clean up a new environment that is set because of unsuccessful migration (e.g., both servers (e.g., first server 102A and second server 102B) and clients (e.g., client 104)). Thus, examples described herein may provide the cloud-based MaaS and an orchestrator service that work together in migrating the server and agent applications with one version to another version and rollback when migration fails.

In some examples, the functionalities described herein, in relation to instructions to implement functions of migration orchestrator 112A, application migration component 114, and any additional instructions described herein in relation to the storage medium, may be implemented as engines or modules including any combination of hardware and programming to implement the functionalities of the modules or engines described herein. The functions of migration orchestrator 112A and application migration component 114 may also be implemented by a respective processor.

Example Processes

Figure 2:
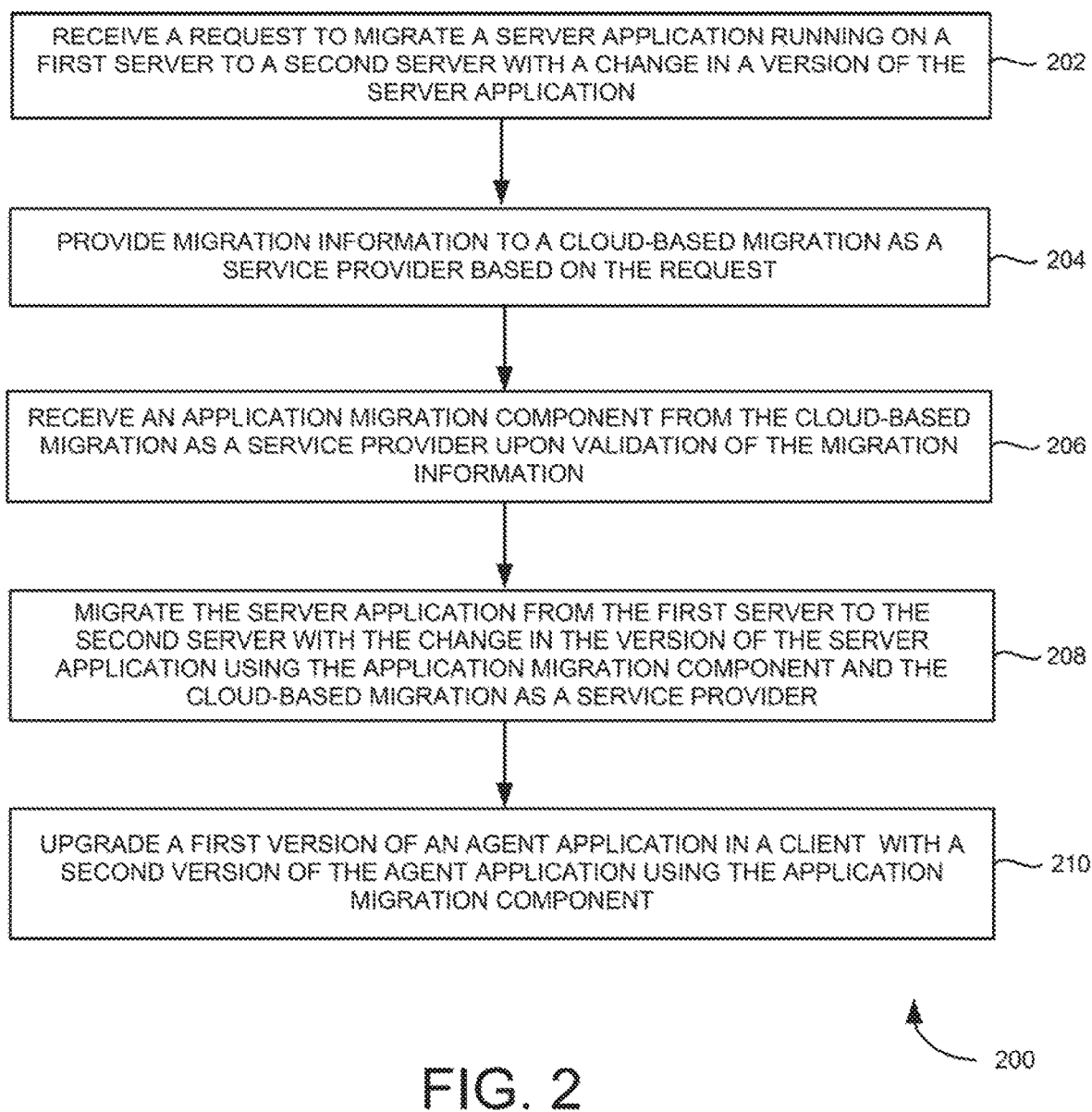
FIG. 2 is an example flow diagram illustrating migration of a server application between servers using a cloud-based MaaS.

FIG. 2 is an example flow diagram 200 illustrating migration of a server application between servers using a cloud-based MaaS in a computing environment. The process or method is performed as a MaaS. It should be understood that the process depicted in FIG. 2 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 202, a request to migrate the server application running on a first server to a second server with a change in a version of the server application may be received. At 204, migration information may be provided to a cloud-based MaaS provider by a migration orchestrator of the first server based on the request. At 206, an application migration component may be received by the migration orchestrator from the cloud-based MaaS provider upon validation of the migration information.

At 208, the server application may be migrated from the first server to the second server with the change in the version of the server application using the application migration component and the cloud-based MaaS provider. At 210, a first version of the agent application in the client may be upgraded with a modified version of the agent application using the application migration component. The agent application may be associated with the server application. Migration of the server application between servers using the cloud-based MaaS is explained in FIGS. 1A and 1B.

Figure 3:
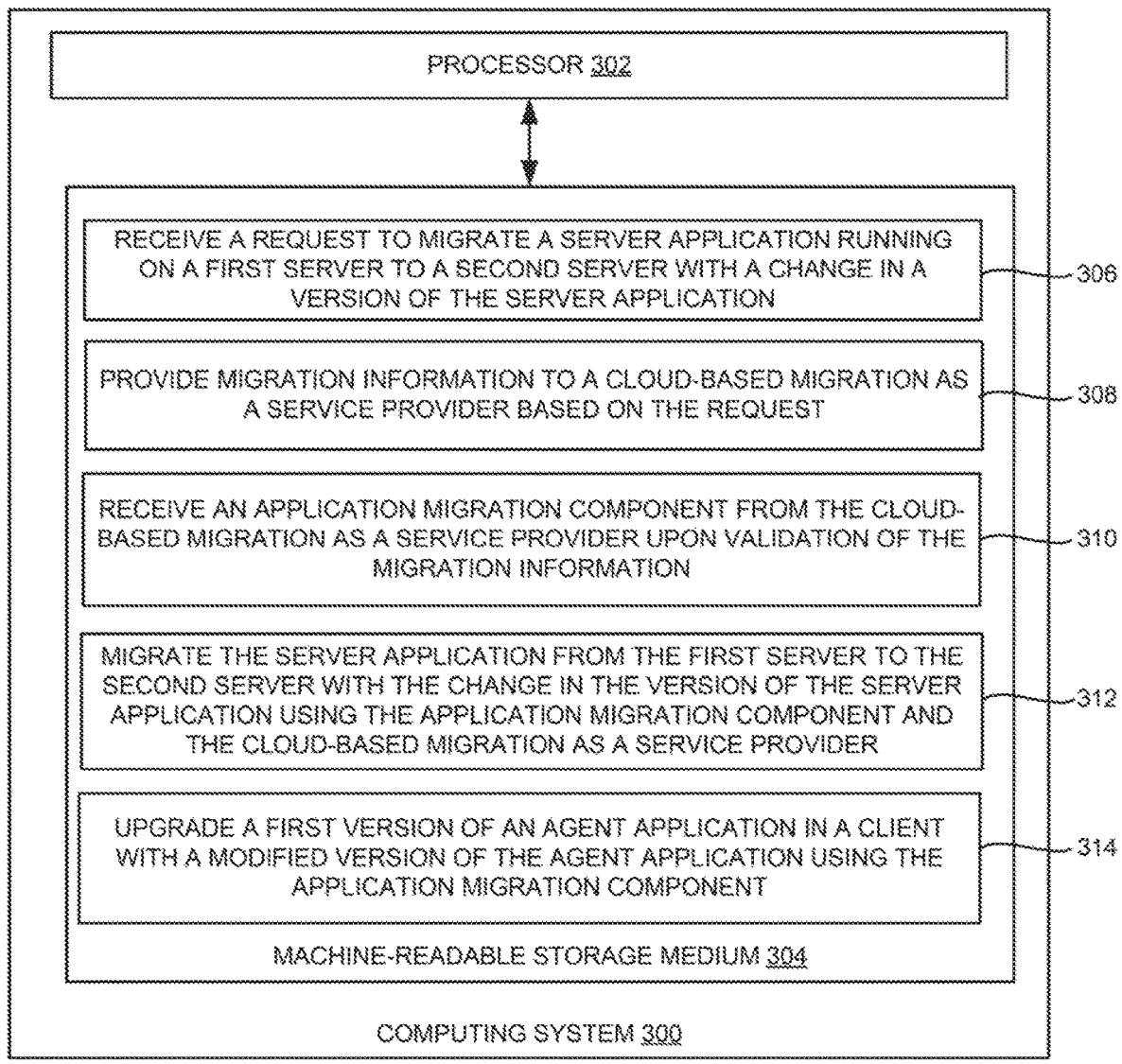
FIG. 3 is a block diagram of an example computing system including a non-transitory computer-readable storage medium, storing instructions to migrate a server application between servers using a cloud-based MaaS.

FIG. 3 is a block diagram of an example computing system 300 including non-transitory computer-readable storage medium, storing instructions to migrate server applications between servers using the cloud-based MaaS. Computing system 300 may include a processor 302 and a machine-readable storage medium 304 communicatively coupled through a system bus. Processor 302 may be any type of central processing unit (CPU), microprocessor, or processing logic that interprets and executes machine-readable instructions stored in machine-readable storage medium 304. Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 304 may be a non-transitory machine-readable medium. In an example, machine-readable storage medium 304 may be remote but accessible to computing system 300.

Machine-readable storage medium 304 may store instructions 306-314. In an example, instructions 306-314 may be executed by processor 302 for migrating server applications between servers using MaaS. Instructions 306 may be executed by processor 302 to receive a request to migrate a server application running on a first server to a second server with a change in a version of the server application. Instructions 308 may be executed by processor 302 to provide migration information to a cloud-based MaaS provider based on the request. Instructions 310 may be executed by processor 302 to receive an application migration component from the cloud-based MaaS provider upon validation of the migration information. Instructions 312 may be executed by processor 302 to migrate the server application from the first server to the second server with the change in the version of the server application using the application migration component and the cloud-based MaaS provider. Further, instructions 314 may be executed by processor 302 to upgrade a first version of an agent application in a client with a modified version of the agent application using the application migration component. The agent application is to communicate with the server application.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
receiving a request to migrate a server application running on a first server to a second server with a change in a version of the server application;
providing, by a migration orchestrator of the first server, migration information to a cloud-based Migration as a Service provider upon receiving the request;
receiving, by the migration orchestrator, an application migration component as a service from the cloud-based Migration as a Service provider upon validation of the migration information;
migrating the server application from the first server to the second server with the change in the version of the server application using the application migration component and the cloud-based Migration as a Service provider;
upon migrating the server application, determining, by an agent migration component of the application migration component, an agent application that runs in a client and communicates with the server application by coordinating with a migration handler of the agent application; and
upon determining the agent application, upgrading a first version of the agent application with a modified version of the agent application using the application migration component to conform to the change in the version of the server application, wherein the modified version of the agent application is to communicate with the changed version of the server application in the second server.

2. The method of claim 1, wherein the migration information comprises configuration details associated with the first server, configuration details associated with the second server, and version details of the server application.

3. The method of claim 1, wherein receiving the application migration component from the cloud-based Migration as a Service provider further comprises loading the application migration component on the first server.

4. The method of claim 1, wherein the method is performed as a Migration as a Service.

5. The method of claim 1, wherein the application migration component comprises a server migration component, a data migration component, a configuration migration component, and the agent migration component to perform migration of the server application from the first server to the second server with the change in the version of the server application.

6. The method of claim 5, wherein migrating the server application from the first server to the second server comprises:
downloading, by the server migration component, at least one binary file associated with a modified version of the server application in the first server; and
deploying, by the server migration component, the at least one binary file in the second server.

7. The method of claim 5, wherein migrating the server application from the first server to the second server comprises:
migrating, by the configuration migration component, configuration data and custom configuration data associated with a first version of the server application to a modified version of the server application between the first server and the second server.

8. The method of claim 5, wherein migrating the server application from the first server to the second server comprises:
providing, by the data migration component, seamless migration from a first version to a modified version of the server application based on configuration details.

9. The method of claim 1, wherein upgrading the first version of the agent application with the modified version of the agent application in the client comprises:
upgrading the first version of the agent application running on the client with the modified version of the agent application by pushing at least one binary file associated with the modified version to the agent application.

10. The method of claim 1, further comprises:
rolling back migration of the server application and upgradation of the first version of the agent application during failover of the migration by the migration rollback component.

11. A system comprising:
a client;
a cloud-based Migration as a Service provider; and
a first server communicatively coupled to the client and the cloud-based Migration as a Service provider, wherein the first server comprises a processor and memory coupled to the processor, and wherein the memory comprises a migration orchestrator to:
receive a request to migrate a server application running on the first saver to a second server with a change in a version of the server application;
provide migration information to the cloud-based Migration as a Service provider upon receiving the request;
receive an application migration component as a service from the cloud-based Migration as a Service provider upon validation of the migration information;
migrate the server application from the first server to the second server with the change in the version of the server application using the application migration component and the cloud-based Migration as a Service provider;
upon migrating the server application, determine an agent application that runs in a client and communicates with the server application by coordinating with a migration handler of the agent application; and
upon determining the agent application, upgrade a first version of the agent application with a modified version of the agent application using the application migration component to conform to the change in the version of the server application, wherein the modified version of the agent application is to communicate with the changed version of the server application in the second server.

12. The system of claim 11, wherein the application migration component comprises a server migration component, a data migration component, a configuration migration component, and an agent migration component to perform migration of the server application from the first server to the second server with the change in the version of the server application.

13. The system of claim 12, wherein the server migration component is to:
download at least one binary file associated with a modified version of the server application in the first server; and
deploy the at least one binary file in the second server.

14. The system of claim 12, wherein the configuration migration component is to:
migrate configuration data and custom configuration data associated with a first version of the server application to a modified version of the server application between the first server and the second server.

15. The system of claim 12, wherein the data migration component is to:
provide seamless migration from a first version to a modified version of the server application based on configuration details.

16. The system of claim 11, wherein the application migration component comprises an agent migration component to:
upgrade the first version of the agent application running on the client with the modified version of the agent application by pushing at least one binary file associated with the modified version to the agent application.

17. The system of claim 11, wherein the application migration component comprises a migration rollback component to:
rollback migration of the server application and upgradation of the first version of the agent application during failover of the migration by the migration rollback component.

18. A non-transitory machine-readable storage medium encoded with instructions that, when executed by a processor, cause the processor to:
receive a request to migrate a server application running on a first server to a second server with a change in a version of the server application;
provide migration information to a cloud-based Migration as a Service provider upon receiving the request;
receive an application migration component as a service from the cloud-based Migration as a Service provider upon validation of the migration information;
migrate the server application from the first server to the second server with the change in the version of the server application using the application migration component and the cloud-based Migration as a Service provider;
upon migrating the server application, determine an agent application that runs in a client and communicates with the server application by coordinating with a migration handler of the agent application; and
upon determining the agent application, upgrade a first version of the agent application with a modified version of the agent application using the application migration component to conform to the change in the version of the server application, wherein the modified version of the agent application is to communicate with the changed version of server application in the second server.

19. The non-transitory machine-readable storage medium of claim 18, wherein the migration information comprises configuration details associated with the first server, configuration details associated with the second server, and version details of the server application.

20. The non-transitory machine-readable storage medium of claim 18, wherein receiving the application migration component from the cloud-based Migration as a Service provider further comprises loading the application migration component on the first server.

21. The non-transitory machine-readable storage medium of claim 18, wherein migrating the server application from the first server to the second server comprises:
downloading at least one binary file associated with a modified version of the server application in the first server; and
deploying the at least one binary file in the second server.

22. The non-transitory machine-readable storage medium of claim 18, wherein migrating the server application from the first server to the second server comprises:
migrating configuration data and custom configuration data associated with a first version of the server application to a modified version of the server application between the first server and the second server.

23. The non-transitory machine-readable storage medium of claim 18, wherein migrating the server application from the first server to the second server comprises:
providing seamless migration from a first version to a modified version of the server application based on configuration details.

24. The non-transitory machine-readable storage medium of claim 18, wherein upgrading the first version of the agent application with the modified version of the agent application in the client comprises:
upgrading the first version of the agent application running on the client with the modified version of the agent application by pushing at least one binary file associated with the modified version to the agent application.

25. The non-transitory machine-readable storage medium of claim 18, further comprising instructions to:
rollback migration of the server application and upgradation of the first version of the agent application during failover of the migration.

* * * * *